Figure 1:
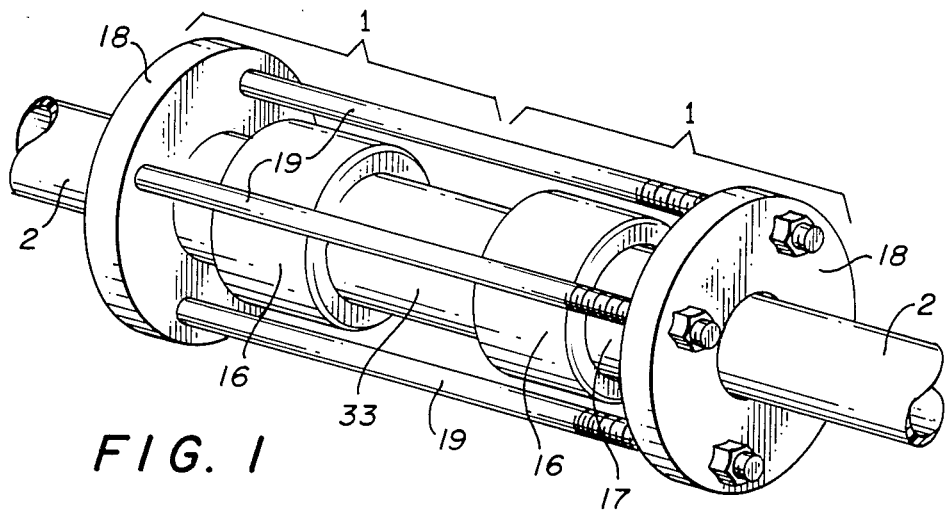

United States Patent [19]

Kok

[11] Patent Number: 4,679,830

[45] Date of Patent: Jul. 14, 1987

[54] TUBE COUPLING

[75] Inventor: Frans J. J. A. Kok, AB Helden, Netherlands

[73] Assignee: Dresser Europe S.A., Belgium

[21] Appl. No.: 735,224

[22] Filed: May 16, 1985

[30] Foreign Application Priority Data

May 17, 1984 [NL] Netherlands .......................... 8401586

[51] Int. Cl.⁴ ............................................. F16L 21/06
[52] U.S. Cl. .................... 285/323; 285/348; 285/369; 285/255; 285/177; 285/906
[58] Field of Search ............... 285/322, 323, 348, 369, 285/255, 177, 906

[56] References Cited

U.S. PATENT DOCUMENTS

| 2,320,813 | 6/1943 | Cowles | 285/348 X |
| 3,266,823 | 8/1966 | Word et al. | 285/323 X |
| 3,815,940 | 6/1974 | Luckenbill | 285/323 X |
| 3,997,199 | 12/1976 | Arnold | 285/322 |
| 4,127,289 | 11/1978 | Daspit | 285/322 |
| 4,445,714 | 5/1984 | Kisiel | 285/323 X |

FOREIGN PATENT DOCUMENTS

| 564045 | 9/1958 | Canada | 285/323 |
| 2453672 | 5/1976 | Fed. Rep. of Germany . | |
| 463209 | 11/1968 | Switzerland . | |

Primary Examiner—Dave W. Arola

[57] ABSTRACT

The invention relates to a tube coupling for connecting a tube portion of synthetic resin to another conduit element with resistance to tensile stress in such a way that said tube portion is firmly held to resist high tensile forces due to shrinkage of the tube conduits or other high tensile forces on the one hand, whereas said tube portion is clamped within the coupling in such a way that the synthetic resin thereof is not overloaded by clamping forces. This is achieved by holding the tube portion of synthetic resin by a combination of a grip ring and an elastic sealing ring.

3 Claims, 7 Drawing Figures

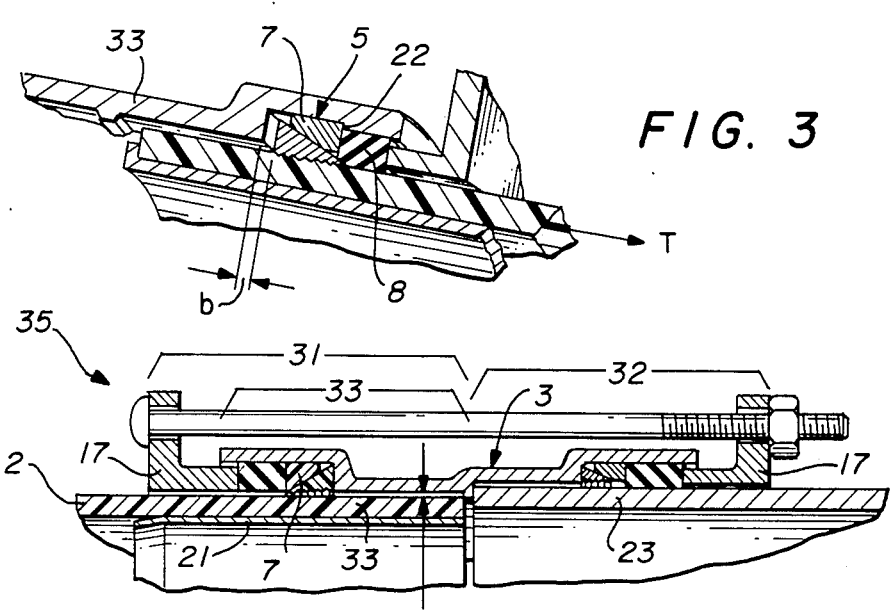
FIG. 3
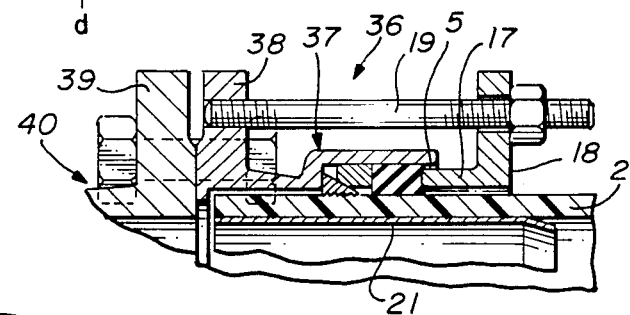
FIG. 4
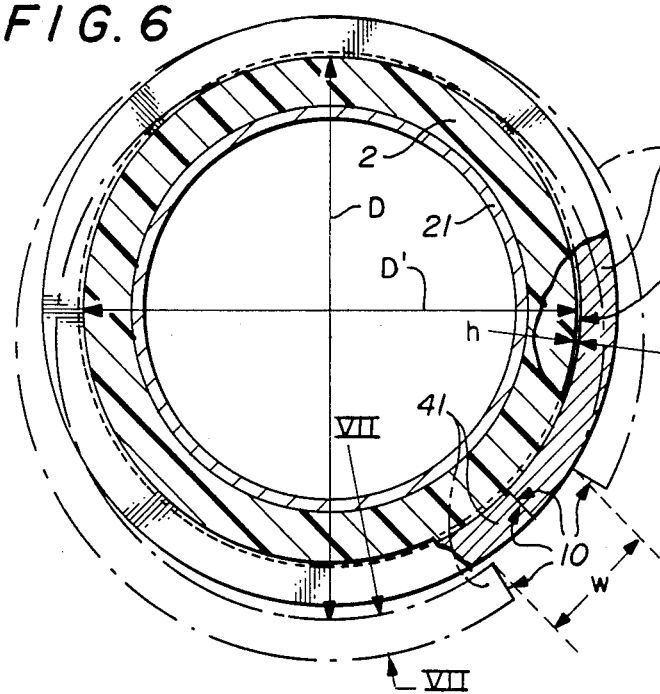
FIG. 6
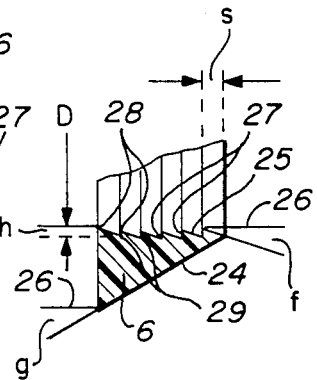
FIG. 5
FIG. 7

TUBE COUPLING

The invention relates to a tube coupling for connecting a tube portion to another conduit with resistance to tensile stress.

In order to resist high tensile forces due to shrinkage of the tube conduits or other high tensile forces the tube coupling should hold tight said tube portion. A metal tube portion can be held tight by means of:

a socket portion surrounding the tube end of the tube portion;

a grip rim engaging the tube portion and having a clamping surface diverging in the direction towards said other conduit element; and a clamping rim engaging the clamp surface of the grip rim.

Such metal tube portion does not run the risk of being damaged by the clamping forces exerted during clamping of the clamping rim. However, in case a tube portion of synthetic resin has to be coupled to another conduit element a great problem arises with respect to holding said tube portion so tight that it will not be pulled out of the socket portion by the tensile forces due to axial shrinkage of the conduit or by other high tensile forces on the one hand and of preventing overload of the tube portion of synthetic resin during clamping of the tube coupling on the other hand.

The invention has for its object to solve this problem. To this aim the invention provides a tube coupling according to claim 1.

The tube coupling according to the invention prevents by means of the support sleeve the tube portion of synthetic resin being excessively deformed in radial direction. Excessive constriction of the wall of this tube portion is prevented as the interabutment of the free ends of the grip rim restricts the inward displacement of the grip rim. Although the permissible radial clamping force onto the tube portion of synthetic resin is restricted, the tube coupling according to the invention holds this tube portion tight due to said grip rim engaging said tube portion by means of its saw teethed innery section. An adequate grip between the grip rim and said tube portion is obtainable for holding tight said tube portion when high axial tensile forces arrise in the tube conduit, provided that an additional holding force is applied onto said tube portion of synthetic resin by the sealing ring. The combination of the non-excessively inwardly displaced saw teethed grip rim and the tensioned sealing ring both exerting holding forces onto said tube portion of synthetic resin prevents said tube portion from being pulled outward of the coupling. During tensioning of the tube coupling as part of the mounting operation the sealing ring is axially compressed simultaneously with clamping of the grip ring. This axial compression of the sealing ring results in a high radial clamping force exerted by the sealing ring onto said tube portion of synthetic resin. The assembly of grip rim and sealing ring hold the tube portion tight, whereas the tube portion is not excessively clamped, even not when the tube portion has a diameter of more than 80 mms, in which case the tube portion is of the thin walled kind in comparison with its outer diameter.

As the tensioning means comprise at least one compression ring engaging the clamping rim through a sealing ring, said sealing ring is compressed with increasing compression force in case of shrinkage of the tube conduit with corresponding increase of tensile forces and in case of other high tensile forces. The radial compression of the sealing ring increases with its axial compression resulting in considerable increases of the friction force between sealing ring and tube portion of synthetic resin. This increased friction force provides an important part of the required holding force exerted by the tube coupling onto said tube portion. It should be noted that the radial load exerted onto the tube part is divided over the total axial length of the grip rim and of the sealing rim, thanks to which excess of the maximum permissible compressive stress is avoided. It is an additional advantage that with increasing tensile force the seal is improved thanks to increased radial compression of the sealing ring.

Preferred embodiments of the tube coupling according to the invention are described in claims 2–6.

The invention will be described more fully hereinafter with reference to a drawing.

Figure 2:
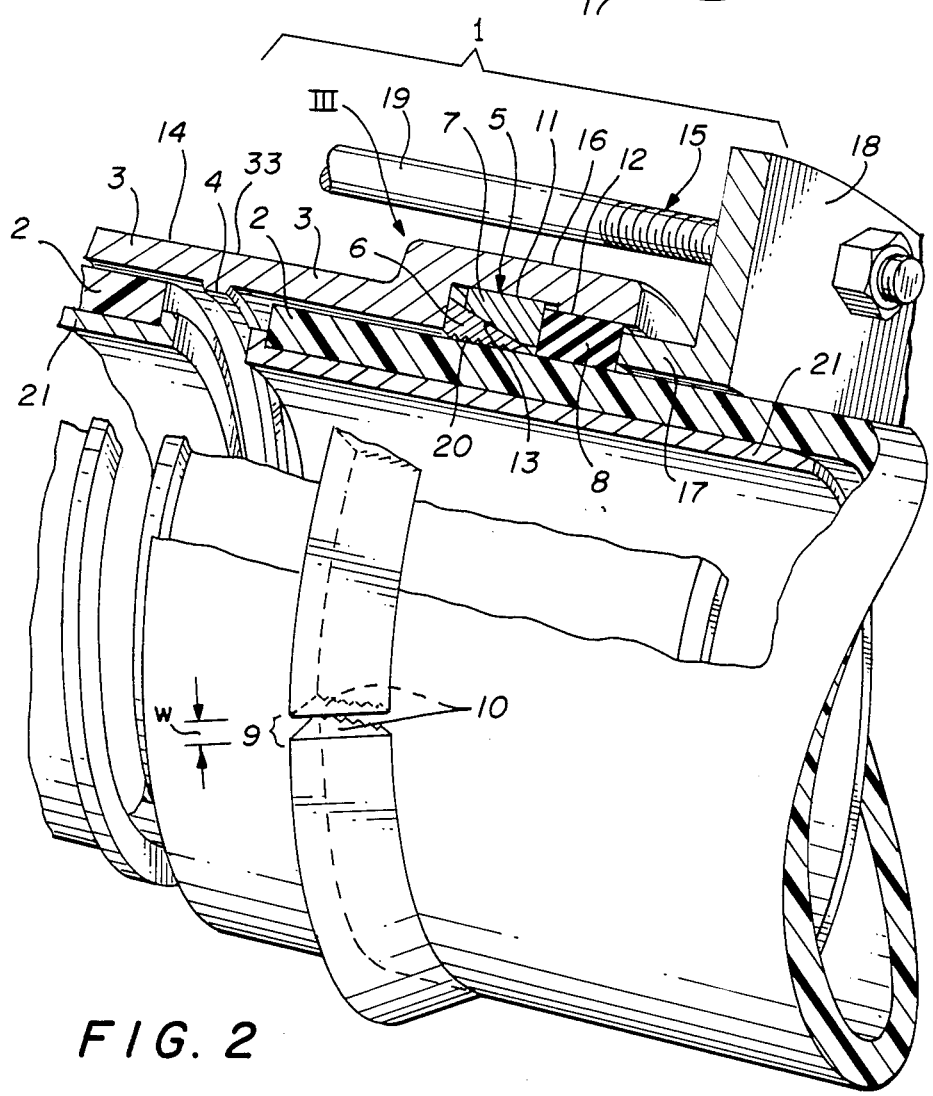

The drawing schematically shows in:

FIG. 1 a perspective view of a tube coupling device comprising two tube couplings embodying the invention, FIG. 2 on an enlarged scale a fraction of the tube coupling device of FIG. 1, FIG. 3 detail III of FIG. 2 with an increased tensile force on the tube couplings of FIGS. 1 and 2, FIGS. 4 and 5 each an elevational view corresponding to FIG. 3 when coupling other tube portions, FIG. 6 with interrupted lines an elevation of an unloaded grip ring of the tube coupling of FIG. 1 and with full lines the same grip ring in compressed condition in combination with a tube part to be coupled, and FIG. 7 a section over line VII—VII of FIG. 6.

FIG. 1 shows a fraction of a tube conduit in the area of the coupling of two tube portions 2 of synthetic resin, for example, polyethene, by means of two tube couplings 1 embodying the invention united in one coupling device. The tube coupling 1 comprises a socket 33 enveloping the ends of the two tube portions 2, said socket 33 being divided into two identical socket portions 3 by an internal stop shoulder 4. The tube portions 2 of high density or medium density polyethene are internally supported by supporting sleeves 21, such that the thin wall of each tube portion 2 is clamped between a supporting sleeve 21 and a grip rim 6. The socket 33 has at its both ends an internal annular space 5 for accommodating a grip rim 6, a clamping rim 7 and an elastic sealing ring 8 of nitrile-butadiene or styrene-butadiene rubber having a hardness of, for example, 75° shore. Further suitable material for the sealing ring is viton or butyle having a slightly different hardness. The grip rim 6 and the clamping rim 7 each consist of a ring. The grip rim 6 has only one circumferential gap 9, the gap surfaces 10 of which are spaced apart by such a small distance w that, when the grip rim 6 is subjected to clamping stress, the minimum diameter thereof is determined by the interabutment of the gap surfaces 10, so that at this area overload of the tube surface 2 is avoided. The grip rim 6 and the clamping rim 7 may each be made of hard steel. Preferably the grip rim 6 is made of synthetic resin, for example, polyacetal reinforced or not reinforced by glass fibre.

When the annular space 5 of FIG. 2 has an annular chamber 11 for receiving the grip rim 6 and the clamping rim 7, the diameter of which is larger than the diameter of a space part 12 for receiving the sealing ring 8, the clamping rim 7 is also split once. The grip rim 6 and the clamping rim 7 are in contact with one another by their conical clamping surfaces 13 diverging towards the other conduit element.

The tube coupling 1 furthermore comprises loading means 15 for loading the clamping rim 7 and the sealing ring 8 with axial pressure in the direction towards the middle 14 of the socket 33. These loading means 15 are constituted by two pressing rings 17 penetrating into the socket portions 16 and by a plurality of tension bolts 19 engaging flanges 18 of the pressing rings 17 and drawing the pressing rings 17 towards one another, said bolts 19 being tensioned up to the prescribed tension by means of a torque spanner during mounting of the tube coupling 1, the sealing ring 8 being tensioned up to 75 bars as a minimum and sometimes even up to 300 bars.

It is noted that for the perfect operation of the tube coupling 1 according to present invention it is important that the clamping rim 7 is separated from the socket 33 in order to permit previous precompression of the sealing ring 8 and of the grip rim 6 by means of the pressing ring 17 up to an adjusted compression stress.

During this clamping operation the grip rims 6 are simultaneously stressed in the radial direction so that their inner surfaces 20 having a saw teeth-shaped section engage the tube portions 2. The saw teeth are directed so that outward movement of the tube ends 2 with respect to the grip rims 6 is counteracted. The teeth surfaces 25 of the saw teeth 24 converge in the direction towards the free end of the tube portion 2 and enclose with the axial direction 26 an angle f of 15°, whereas the other teeth surfaces 27 extend perpendicular to the axial direction 26. The teeth length s is 3.3 mms and the teeth height h is 0.85 mms, the teeth 24 having sharp points 28 in section. The grip rim 6 is made of synthetic resin, preferably polyacetal. The conical clamping surface 29 encloses with the axial direction 26 such angle g that the grip rim 6 and the clamping rim 7 self-disengageably engage each other. The angle g is, for example, 30°. The grip rim 6 of a tube coupling 1 for coupling a tube portion 2 of synthetic resin having an outer diameter d of 160 mms consists of a single ring element having an inner diameter D of 170 mms. The width w of the gap 9 is such that the tube portion 2 is not excessively constricted by a possible excessive clamping force, thanks to interabutment of the ends 41 with their gap surfaces 10.

To this aim with width w of gap 9 is determined by the equation:

$$\pi \times (d' - 2h) = \pi \times D - w$$

wherein D' is the outer diameter of the tube portion 2 when being inwardly compressed onto a support sleeve 21 (see FIG. 6).

With interabutment of the ends 41 the teeth 24 are practically completely accommodated in the synthetic resin of the tube portion 2. The sealing rings 8 compressed up to high stress also hold the tube portions 2 tight, the construction of the tube coupling embodying present invention being such that drawing tube portions 2 out of the tube couplings 1 is avoided by the assembly of the sealing ring 8 and the grip rim 6.

As shown in FIG. 3 the tube portion 2 can shift outwardly with a high tensile force T exerted on the tube portion 2 with respect to the socket 33 over a distance b, the sealing ring 8 being additionally compressed. The distance b is limited by the clamping rim 7 abutting a shoulder 22 of the annular space 5.

The tube coupling 31 of the left hand part of the tube coupling device 35 of FIG. 4 corresponds with that of FIG. 3 but a shoulder 22 is lacking. The clamping rim 7 may then be closed and the socket portion 3 is then not loaded internally by a radial clamping force.

By means of the tube coupling 32 of the right hand part of the tube coupling device 35 a steel tube portion 23 is coupled with a tube portion 2 of synthetic resin.

The tube coupling 1 embodying the invention can be used for tube portions 2 having an outer diameter of 16 cms and a wall thickness of 9 or 14.6 mms and can withstand any resultant tensile force of 12,400 to 18,000 kgf.

As a matter of fact the tube coupling 1 embodying the invention may also be used for other outer tube diameters d larger than 80 mms and for coupling of tube portions of synthetic resin having other outer diameter-wall thickness proportions.

The tube coupling 36 of FIG. 5 comprises a socket 37 having a flange 38 for fastening this socket 37 to the flange 39 of a conduit element 40 which may constitute the outlet or the inlet of a pump. A pressing element 18 is compressed with the aid of bolts 19 screwed into the flange 38 into the annular space 5 of the socket 37.

What I claim is:

1. A tube coupling (1) for connecting a tube portion (2) of synthetic resin with another conduit element, comprising:

a socket portion (3) surrounding the tube end of said tube portion (2) and having an abutment should therein;

at least one grip rim (6) disposed within the socket portion (3) and engaging the tube portion (2) and having a diverging clamping surface (13) diverging in the direction towards said other conduit element;

at least one sealing ring (8) disposed within the socket portion (3) adjacent the grip rim (6) of elastic material;

at least one clamping rim (7) disposed within the socket portion (3) and having a diverging clamping surface (13) diverging in the direction towards the tube portion (2) for contacting in a self disengaging and self engaging ramping relation with the diverging clamping surface (13) of said grip rim (6);

loading means (15) for loading said clamping rim (7) and said sealing ring (8) with axial compression in the direction towards said other conduit element;

said loading means (15) comprising at least one pressing ring (17) penetrating into the socket portion (3) for engaging said clamping rim (7) through said sealing ring (8) and further including a plurality of tension bolts (19) engaging a flange (18) integrally formed with the pressing ring (17) for drawing the pressing ring (17) towards said other conduit element as said pressing ring (17) penetrates into the socket portion (3);

said grip rim (6) having a saw teethed longitudinal section at its inner side, including teeth (24) having teeth surfaces (25) of said saw teethed longitudinal section converging in the direction towards the free end of said tube portion (2);

at least one support sleeve (21) internally supporting said tube portion (2) of synthetic resin:

said grip rim (6) having at least one gap (9) at its circumference;

said gap (9) having a width (w) equal to the product of $\pi$ and the inner diameter (D) of the grip ring (6) diminished by the product of $\pi$ and the outer diameter (D′) of the tube portion (2) diminished by the product of $2\pi$ and the height (h) of said teeth (24); said grip rim (6) having such total circumferential length, that during operation of compressing the grip rim (6) by causing the pressing ring (17) to engage the sealing ring (8) along its circumference which causes the sealing ring (8) to engage the clamping rim (7) along its circumference thereby axially compressing the sealing ring (8) and increasing the frictional force between the sealing ring (8) and the tube portion (2) and further causing the clamping rim (7) to engage the grip rim (6) along their contacting diverging surfaces (13), thereby simultaneously causing the free ends (41) of the grip rim (6) bounding said gap (9) to interabut to prevent excessive constriction of the tube portion (2) while the teeth surfaces (25) of the saw teethed longitudinal section engage the tube portion (2) to thereby prevent movement of the tube portion (2) and;

said sealing ring (8) being further compressed between said clamp rim (7) and said pressure ring (17) when a force is exerted on the tube portion (2) in the direction towards the free end of tube portion (2) to thereby exert an increased force on said clamp rim (7) to thereby prevent movement of the tube portion (2).

2. A tube coupling (1) as claimed in claim 1, characterized in that the clamping rim (7) is made of synthetic resin.

3. A tube coupling (1) as claimed in claim 1, characterized in that the clamping rim (7) is constituted by a ring having a closed circumference.

* * * * *